Patented Dec. 10, 1935

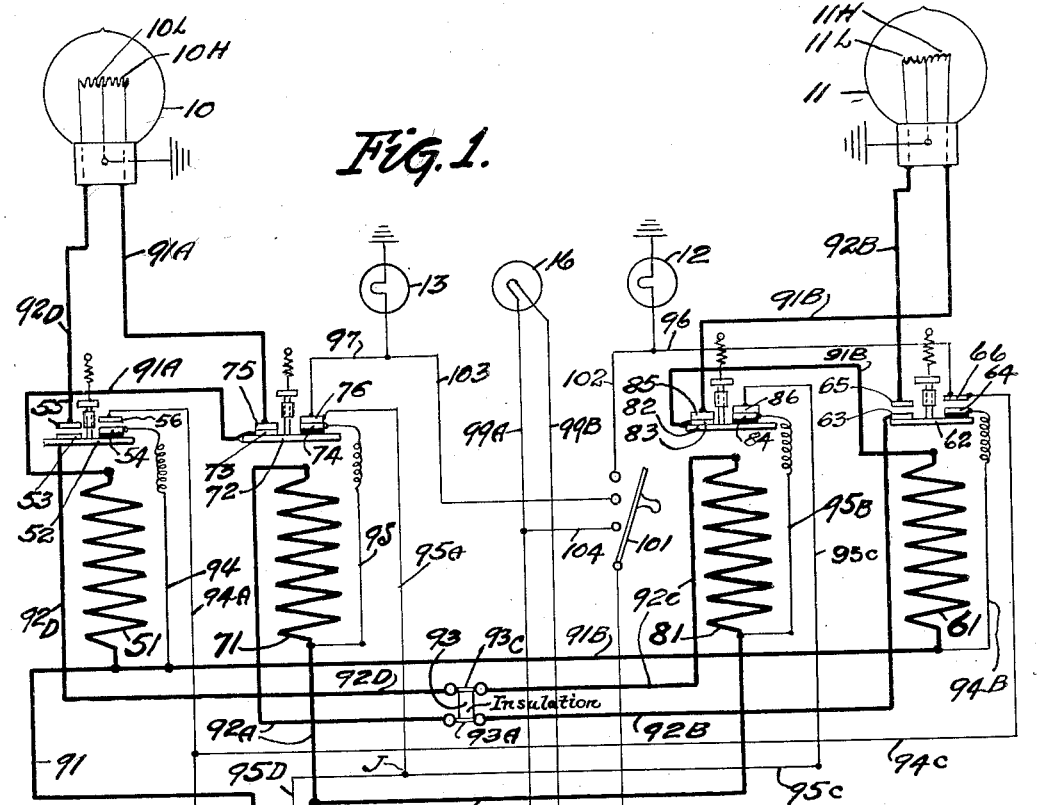

2,023,954

UNITED STATES PATENT OFFICE 2,023,954

ELECTRIC LIGHTING SYSTEM FOR AUTOMOBILES

Lemuel L. Hagar and William B. Rollins, Memphis, Tenn., assignors of one-third to Dr. V. J. Demarco, Memphis, Tenn.

Application May 9, 1934, Serial No. 724,734

5 Claims. (Cl. 171—97)

This invention relates to electric lighting systems for automobiles, and has particular reference to lighting systems which employ two lights in each headlight optionally usable, and which preferably employ duplicate tail lights.

It has particular reference to automatic switching means, which is adapted when a light in either headlight burns out, to automatically cut out the corresponding light in the other headlight, and to switch on the remaining light in both headlights.

It further relates to manual means for changing-over the headlight circuits, whereby when one of the two lights in a headlight burns out, the other thereof is automatically cut in without effect on the opposite headlight, and to means for automatically switching to spare tail light when the one in use burns out.

Automobiles at the present time are usually equipped with headlights, each having one bulb with two filaments which may be of the same candle power, or different candle power. One pair of lights, one, in each headlight, is usually focused and directed to strike the pavement at a considerable distance in advance of the car, whereas the other pair of lights of the headlights is focused and directed to strike the pavement much nearer the car. The first pair of these lights is commonly designated the high-lights, and the second pair, the low-lights. The same effect is also accomplished by the use of bulbs having two filaments of unequal power, the stronger light being designated the high-light and the weaker, the low-light, and the use of the term "high and low lights", herein will be understood to refer to either one of the above conditions.

One set of these lights is used for ordinary driving, and the other when passing another car, or for driving in lighted areas, such as city streets, where more powerful lights are not necessary.

It often happens that one of the lights in use burns out, without the driver of the car being aware of the fact, and a dangerous condition is set up, in that the driver of an approaching car cannot determine whether the single headlight visible, is at the right, or the left side of the car, or whether the approaching vehicle is as a matter of fact, a motorcycle or other vehicle properly having only a single headlight.

The primary object of the present invention is to automatically switch on the second pair of lights, simultaneously or individually, should one light of the other pair burn out;

Further objects are:

To provide means for interlocking the circuits of a pair of headlights, whereby when one light of either headlight burns out, the remaining light therein and the corresponding light in the other headlight are switched on, and the light in such second headlight corresponding to the burned out light is switched off;

To provide means for automatically switching on a warning signal indicating that a light has burned out, and whether such light be a high-light or a low-light;

To provide means for changing-over the circuits, whereby the second light of either headlight will automatically be switched on when the other light of the same headlight burns out;

And to provide means for automatically switching over, should one of two tail lights burn out, to the remaining tail light, and for indicating that the tail light originally used has burned out.

The means by which the foregoing and other objects are accomplished and the manner of their accomplishment, with slight change in car wiring will readily be understood from the following specification on reference to the accompanying drawing, in which,—

Fig. 1 is a drawing showing in diagrammatic form a dual electric lighting system for an automobile, embodying the present invention, this drawing having the various circuits indicated in full and dashed lines, and lines of different weight; the controls and circuits being shown open or closed as they would be with the manual switches closed to throw on the high-lights.

Fig. 2 is a fragmentary detail of a portion of the circuits showing a change-over switch thrown to change the circuits and sequence of operation of certain relays, whereby each of the headlights will be caused to act individually.

Referring now to the drawing in which the various parts are indicated by numerals, 10 and 11 indicate respectively the left and right headlights of an automobile, the left headlight having high and low-lights, 10H and 10L, and the right headlight corresponding high and low-lights 11H and 11L.

12 and 13 are signal lights or tell-tales for the high-lights and the low-lights respectively.

14 and 15 are tail lights, and 16 a signal light or tell-tale for the tail lights.

17 is a battery illustrative of a source of current. 18 is a control switch, and 19—20 are two arms of a double throw switch lever S, but manually controlled. The two arms of the switch lever S will be hereinafter referred to as switch 19 or switch 20.

21 and 31 are manually selected relays in series with the high-light and low-light circuits, the function of which is to close and maintain closed a part of the by-pass circuits of the automatically selective pairs of relays in the high-light and low-light circuits respective to the circuit being used, said relays hereinafter to be referred to as relays 21 and 31, respectively. Each of said relays include an armature 22 and 32, respectively; which armatures, in turn, carry contacts 23 and 33, respectively, adapted to cooperate with fixed contacts 25 and 35, each armature being biased to hold its contacts open until the control switch 18 and the arm 19 or 20 of the double throw switch S is closed.

41 is a relay in the tail light circuit, this relay having an armature 42, carrying insulated contact 43, and a fixed contact 45. This armature is biased to hold the contacts closed when the circuit is open, and open when the circuit is closed.

51, 61 are relays in the circuits to the high-lights and 71, 81 relays in the low-light circuits. Each relay is provided with an armature 52, 62, 72 and 82, respectively, having fixed thereto the pairs of contacts 53, 54; 63, 64; 73, 74; and 83, 84; respectively, the contacts 54, 64, 74 and 84 being insulated from their armatures and from the other contacts. 55, 56; 65, 66; 75, 76; and 85, 86 are corresponding pairs of fixed contacts. These armatures are biased to hold their contacts closed when their respective relay circuits are open, and open when these circuits are active.

90 is a circuit leading from the battery 17, through switch 18 to switch 19—20. 91 is a circuit, leading from switch 19, through relay coil 21, to the high-lights, one branch 91A leading through relay coil 51 to contact 73 and continuing from contact 75 to the left high-light 10H, and the other branch 91B through relay coil 61 to contact 83 and from contact 85 to high-light 11H.

92 is a circuit leading from switch 20 through relay coil 31 to the low-lights, one branch 92A leading through relay coil 71 to a changeover switch 93, thence continuing through circuit 92B to contact 63, thence from contact 65 when switch is closed to the right low-light 11L, and the other branch 92C, leading through coil 81 to changeover switch 93, thence continuing through circuit 92D to contact 53 and from contact 55 to the left low-light 10L.

The change-over switch 93 may be introduced in the circuits 92A, 92C, if it be so desired. This switch carries two members 93A, 93C, the former of which when set as shown in Figure 1 for what may be designated full change-over, effects continuity of the circuit 92A—92B and the latter of the circuit 92C—92D. This switch 93 may be turned to bring the members 93A—93C across the circuits as shown in Figure 2, into what may be designated as half change-over, in which case these circuits are cut in two, circuit 92A after passing coil 71 being connected to circuit 92D, and circuit 92C after passing relay coil 81 being connected to circuit 92B.

Bypass circuits for coils 51 and 61: 94—94A and 94B—94C are similar bypass circuits leading from circuits 91 and 91B through contacts 54—56 and 64—66, respectively; when change-over of lights close said contacts to a junction with a common circuit 94D, similar or dual bypass circuits are incorporated to allow for the change-over action to start in either headlight, left or right.

94—94A, 94B—94C are bypass circuits from main circuit 91 to contact 54—56, main circuit 91B to contacts 64—66, respectively, to common circuit 94D contact 25—23, circuit 94E to low line 92. Both bypass circuits are open at contact pairs 54—56 and 64—66 when both high lights are burning.

100 is a test line leading from tail circuit 90—98 to a switch 101 having three contact points from which lines 102, 103 and 104 lead to the signal light circuits 96, 97, and 99A, closure of the switch lighting all signals.

The operation of the system is as follows:

With the change-over switch 93 set as in Figure 1, and the switches 18 and 19 closed to establish a circuit to the high-lights, current flows through the circuit 91—91A, to the grounded high-light 10H and through the circuit 91—91B to the grounded high-light 11H, putting these two lights in operation.

This current flowing through relay coil 21 closes contacts 23—25 and also flowing through relays 51 and 61, opens contacts 53—55; 54—56; and 63—65; 64—66. Should either high-light burn out, as for instance, the left high-light 10H, current flow in circuit 91, 91A is interrupted, and relay coil 51 is deenergized, allowing contacts 53—55 and 54—56 to close. Current from circuit 91B now flows through by-pass 94, and closed contacts 54—56 and through the circuit 94A, 94D closed contacts 23—25 and circuit 94E to circuit 92, thence through circuits 92—92C, through relay coil 81, circuits 92C, 92D and closed contacts 53—55 to left low-light 10L, putting this light into operation. The current thus flowing through relay coil 81 opens contacts 83—85 and 84—86, contacts 83—85 opening, break circuit 91B to high-light 11H and turn this light off; at the same time relay 61 is de-energized, allowing contacts 63—65 and 64—66 to close.

Contacts 63—65 closing, complete circuit 92B to right low-light and turns such light on, thus completing the shift from the two high-lights to the two low-lights. Also contact 64—66 being closed, current will flow from circuit 91B through bypass 94B, contacts 64—66, 94C, to common circuit 94D, contacts 23—25 circuit 94E to low line 92. High-light signal connects to common circuit 94D.

An entirely similar sequence of operation follows where the low-lights are on, and a low-light burns out.

With the change-over switch 93 set as in Figure 1, and the switches 18 and 20 closed to establish a circuit to the low-lights, current flows through the circuit 92—92A—92B to the grounded low-light 11L and through the circuit 92—92C—92D to the grounded low-light 10L, putting these two lights in operation.

Bypass circuits for relay coils 71 and 81: 95—95A and 95B—95C are similar bypass circuits leading from circuits 92 and 92C through contacts 74—76 and 84—86, respectively, when change-over of lights close said contacts to a junction with a common circuit 95D.

Signals: high signal 12 connects to common circuit 94D. Low signal 13 connects to common circuit 95D.

This current flowing through relay coil 31 closes contacts 33—35 and also flowing through relay coils 71—81, opens contacts 73—75, 74—76, and 83—85, 84—86. Should either low-light burn out, as for instance the left low-light 10L, current flow in circuit 92C—92D is interrupted, and relay 81 de-energized, allowing contacts 83—85 and 84—86 to close. Current from circuit 92C now flows through bypass 95B and closed contacts 84—86 through circuit 95C and 95D, closed contacts 33—35 circuit 95E and 91 and 91B through relay coil 61, and closed contacts 83—85 to right high-light 11H, putting this light into operation. The current thus flowing through relay 61 opens contacts 63—65 and 64—66, contacts 63—65 opening, breaks circuit 92B to right low-light 11L and turns this light off; at the same time relay 71 is de-energized, allowing contacts 73—75 and 74—76 to close.

Contacts 73—75 closing complete circuit 91—91A to left high-light 10H and turns light on, thus completing the shift from the two low-lights to the two high-lights. Also contact 74—76 being closed, current will flow from circuit 92A through bypass 95 closed contacts 74—76 and circuit 95A to common circuit 95D contacts 33—35 circuit 95E to high line 91 and 91B.

With the change-over switch 93 set in half change-over, as shown in Figure 2, and the switches 18 and 19 closed, current flows through circuit 91, 91A to left high-light 10H and through 91—91B to right high-light 11H, putting these two lights in operation. This current flowing through relay coil 21 closes contacts 23—25 and through relay coils 51 and 61, opens contacts 53—55; 54—56 and 63—65; 64—66. Should either high-light burn out as for instance, the left high-light 10H, relay coil 51 is de-energized, allowing contacts 53—55, 54—56 to close. Current now flows through bypass 94, contacts 54—56, circuit 94A, 94D, contacts 23—25 and circuit 94E, to low-line 92; thence through low-line 92, relay 71, low-line 92A, change-over member 93A, and low-line 92D contacts 53—55, to left low-light 10L, putting such light in service in place of left high-light 10H, which is burned out, not disturbing opposite high or low-light, 11H; 11L.

An entirely similar sequence of operation follows where the low-lights are on and a low-light burns out.

With the switch 18 on, current flows through circuit 90—98 to grounded rear light 14. This current passing through relay coil 41 holds contacts 43—45 open. Should tail light 14 burn out, coil 41 is de-energized, allowing contacts 43—45 to close. Current then flows through bypass line 99, contacts 43—45, line 99A, tail-signal 16 and line 99B to tail light 15, putting both tail-signal and reserve tail light 15 in operation. In this situation, should tail light 15 burn out, tail-signal 16 would also be cut out.

At any time during operation of the lights with the switch 18 closed, test switch 101 may be closed and the signal bulbs tested. A circuit will then be established from the tail light circuit, through bypass 100 to switch 101 and circuits 102, 103 and 104.

We claim:
1. Electrical lighting apparatus comprising a source of electrical energy, two pairs of circuits, a light in each circuit, a switch for selectively energizing either of said pairs of circuits, and means operable by a break in either circuit of the energized pair of circuits for de-energizing the other circuit of said energized pair and for automatically energizing the other pair of circuits, and means operable by a subsequent break in one light of the automatically energized circuits to restore energy to the unbroken circuit in the originally energized pair of circuits.

2. Electrical lighting apparatus comprising a source of electrical energy, four lights, selective pairs of circuits for connecting said lights in pairs to said source, and means operable by a break in either circuit of the energized pair of circuits for automatically connecting the other pair of circuits to said source and for disconnecting the unbroken circuit of the originally energized pair.

3. Electrical lighting apparatus comprising a source of electrical energy, four lights, selective pairs of circuits for connecting said lights in pairs to said source, means operable by a break in either circuit of the energized pair of circuits for automatically connecting the other pair of circuits to said source and for disconnecting the unbroken circuit of the originally energized pair, and means operable by a break in either circuit of said other pair for reconnecting said unbroken circuit to said source.

4. Electrical lighting apparatus comprising a source of electrical energy; two pairs of lights; a circuit for one of said pairs of lights; a second circuit for the other pair of lights; a switch for selectively connecting either of said circuits to said source; each circuit including a pair of relays in parallel with each other and in series with the lights in that circuit, and also including a relay in series with the said pair of relays, the relays in either circuit being operable by a break in the selectively energized circuit to connect the other circuit to send source of energy.

5. Electrical lighting apparatus comprising a source of electrical energy; two pairs of lights; a circuit for one of said pairs of lights; a second circuit for the other pair of lights; a switch for selectively connecting either of said circuits to said source; each circuit including a pair of relays in parallel with each other and in series with the lights in that circuit, and also including a relay in series with the said pair of relays, the relays in either circuit being operable by a break in the selectively energized circuit to connect the other circuit to said source of energy, and a switch in one of said circuits for changing the circuit connection of the relays in each circuit to said lights.

LEMUEL L. HAGAR.
WILLIAM B. ROLLINS.